Patented Jan. 2, 1923.

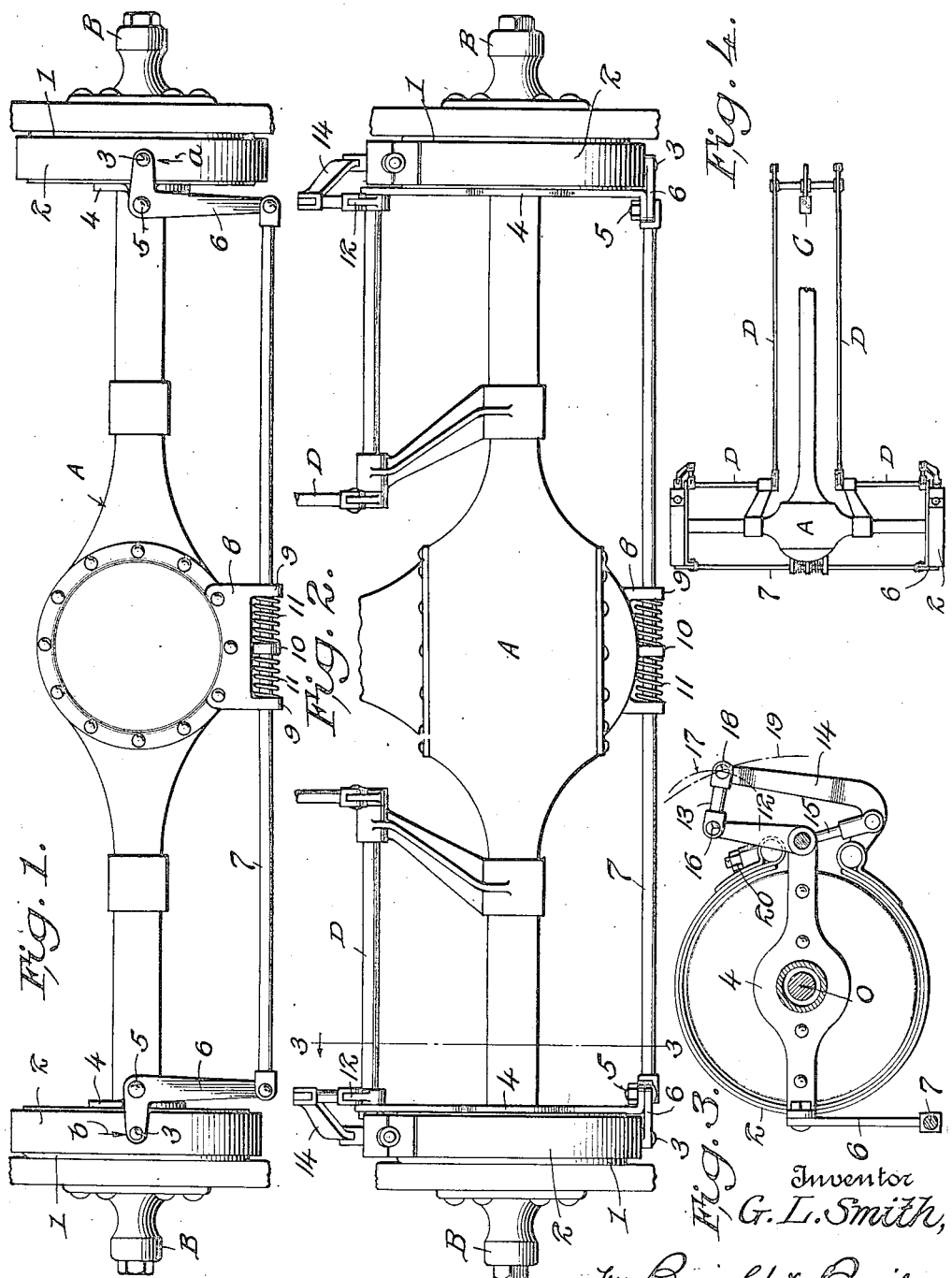

1,440,842

UNITED STATES PATENT OFFICE.

GEORGE L. SMITH, OF WASHINGTON, DISTRICT OF COLUMBIA, ASSIGNOR TO UNITED STATES ORDNANCE COMPANY, OF WASHINGTON, DISTRICT OF COLUMBIA, A CORPORATION OF VIRGINIA.

FRICTION BRAKE.

Application filed November 30, 1921. Serial No. 518,940.

*To all whom it may concern:*

Be it known that I, GEORGE L. SMITH, a citizen of the United States, and resident of Washington, in the District of Columbia, have invented certain new and useful Improvements in Friction Brakes, of which the following is a specification.

My invention relates to friction brakes of the band type and more especially to the equalization of the braking force exerted by two such brakes operated by one control lever or pedal, such as is usually found on motor vehicles.

The wheel brakes of such vehicles are in many cases operated through the medium of a so called brake equalizer, generally in the form of a yoke, which divides equally between the two brake bands the pressure applied by operation of the foot or hand lever. This equalizer does not, however, ensure an equal braking force of the two wheels on the road for the reason that this force depends upon the co-efficient of friction of the brake bands as well as upon the surface pressure of these bands upon the brake drums. Investigation has developed the fact that considerable variation in the co-efficient of friction of brake band lining takes place as this lining tends to acquire a glazed surface. As the glaze develops, the co-efficient of friction falls and as the glaze wears off, the co-efficient of friction rises again. This explains the reason for the difficulty experienced in keeping the wheel brakes of a motor vehicle properly adjusted and demonstrates the necessity for my equalizing system which neutralizes the effect of any variation in the co-efficient of friction.

To overcome this defect and insure an equal drag of each wheel on the road, it is my purpose to replace the present brake equalizer with one which will automatically produce an equal braking force on each wheel regardless of any variation in the co-efficient of friction, and at the same time to provide a visual means for determining the proper initial adjustment of the bands to secure such automatic control.

I will describe my invention in the best form known to me at present and as applied to the conventional type of rear axle of a motor vehicle, but it will be understood that my invention is in no way limited to such use and that it is applicable to any braking system employing two band brakes either of the contracting or expanding type from each of which an equal braking effect is desired.

Furthermore it will be apparent that my invention is susceptible to changes in forms and proportions and to desirable additions with the exercise of ordinary mechanical skill and without departing from the scope of the invention as set forth in the appended claims.

In the drawing chosen to illustrate my invention

Figure 1 is a rear view of the rear axle of an automobile equipped with my invention.

Figure 2, a plan view of what is shown in Figure 1;

Figure 3, a section on the line 3—3 of Figure 2; and

Figure 4, a plan view of a conventional brake mechanism of an automobile with my invention operatively included.

In the drawing A represents the outline of the rear axle of an automobile, and B, B the rear wheel hubs. 1, 1 represent the two brake drums secured to the rear wheel hubs and 2, 2 the contracting brake bands surrounding these drums. 3, 3 represent the anchor studs secured to the bands 2, 2 and which ordinarily serve to hold these bands against rotation. The brackets 4, 4 are secured to the rear axle and carry the studs or pivot pins 5, 5 upon which are mounted two bell-crank levers 6, 6. These levers fit over the anchor studs 3, 3 and their lower ends are connected by a connecting rod 7.

A bracket 8 is bolted to the central portion of the rear axle A and carries two flanges 9, 9 through which the rod 7 passes. A collar 10 is secured to the rod 7 at its middle point and two springs 11, 11 are mounted on this rod so that their ends press against the flanges 9, 9 and the two sides of the collar 10 and maintain the connecting rod in its central position when the brakes are inoperative.

When the two bands are compressed against their respective drums to stop the vehicle an upward pull will be normally exerted upon the short arms of the bell-cranks 6, 6 by the anchor studs 3, 3 and the connecting rod 7 will be placed in tension. Now, if the right brake, for instance, exerts a greater pull than the left one then the long arms of bell-cranks and connecting rod will swing to the right, the right band will rotate in the direction of the arrow $a$ and the left band in the reverse direction indicated by the arrow $b$. If the left brake exerts the greater pull then the reverse movement will take place.

This rotation of the bands is utilized to increase the surface pressure of the band exerting the lesser pull and to reduce the surface pressure of the band exerting the greater pull until an equalization of forces is obtained as follows.

Referring to Fig. 3 in which the band is shown in contracted engagement with the brake drum, the lever 12 is rotated clockwise from its inoperative position by pressure on the foot pedal C which is of conventional type through conventional connections D. The lever 12 has a duplicate on the other side of the vehicle as shown in Fig. 2 which is likewise simultaneously operated by the foot pedal C and connections D and it will be understood that no equalizer is contained in this operating system so that movement of the foot pedal by the driver will effect an equal and positive rotative movement of both the levers 12. Rotation of each lever 12 actuates the toggle lever 14 through a link 13 to set the brake bands an equal amount on each side. Now it will be noted that each band 2 when rotated in either direction by the movement of the bell-cranks 6, 6 and the rod 7 will carry with it the bolt 15 and the lever 14, but the lever 12, being fixed to the rear axle in the usual manner and held against rotation by the operation of the foot or hand lever provided for setting the brakes, will remain in the position shown in the drawing. Therefore, the pivot 16 of this lever may be considered as fixed, while the rotation of the band produces an angular movement of the link 13 around this pivot 16 and the pivot 18 travels along the arc 17. Now, considering the movement of the upper end of the lever 14 it is evident that it also must travel along the arc 17 and that an angular movement of this lever will take place increasing the braking pressure for an upward movement of the pivot 18 and decreasing the braking pressure for a downward movement of this pivot, since, to maintain the pressure constant for a rotary movement of the brake band it would be necessary for the pivot 18 to travel along the arc 19 struck from the center O of the brake drum.

Again, assuming that the right band exerts the greater braking force, rotation in the direction of the arrow $a$ will take place, the pivot 18 will swing in and down and the pressure of the right brake will be reduced. For the left brake the reverse movement will take place and the pressure of the left brake will be increased. Hence it is seen that any inequality of braking force will be reduced to zero and a balance of these forces will be effected. It will also be seen that this result is obtained without any change in the conventional type of wheel brakes other than the addition of my equalizing cross-connection and centering devices 8, 9, 10 and 11.

In effecting this balance of forces the connecting rod 7 moves to the right or left until such balance is obtained and it is readily seen that this movement can be noted by observing the collar 10 and springs 11, or by observing the action of the bell-cranks 6—6. As brake bands are all provided with adjusting means such as the nut 20, it becomes a very simple matter to tighten up on one band or the other until it is noted that the collar 10 stays approximately in its central position when the brakes are applied to retard forward motion of the car. After this adjustment is made variations in the co-efficient of friction of the two brake bands will be neutralized by my equalizing system. Should there be any extensive change in the action of either brake owing to one band wearing down faster than the other or one band becoming greased up more than the other further adjustment of the bands might be necessary to prevent the equalizer reaching its limit of movement, but as this situation can be easily detected, it becomes possible, by occasional inspection to keep the wheel brakes in accurate adjustment at all times.

While I have specifically shown and described means for visually indicating the accuracy of the adjustment of the brakes, it will be apparent that other indicating means for that purpose could be employed.

I claim:—

1. In a brake system, the combination with duplicate brakes, of mechanism to equalize the braking effect of said brakes when the latter are applied and including connections between the brakes, and means operable independently of said connections to apply the brakes.

2. In a brake system, the combination with duplicate brakes and a common brake operating device, of means anchoring said brakes against all similarly directed rotary movements and coacting with said device to equalize the braking effect of said brakes when operated by said device.

3. In a brake system, the combination with duplicate brakes and a common brake operating device, of means independent of said device anchoring said brakes against similarly directed rotary movements in either direction, said means coacting with said device to equalize the braking effect of said brakes when operated by said device.

4. In a brake system including duplicate brakes and a common brake operating device, the combination of two brake elements, connections between said elements operated by the action of unequal braking effects of the brake elements to produce oppositely directed rotary movements of said elements, and means separate from said connection operable by said rotary movements to produce oppositely applied variations in the braking pressure of said elements.

5. In a brake system including duplicate brakes and a common brake operating device, the combination of two brake elements, connections between said elements operated in either direction from a neutral position by the action of unequal braking effects of the brake elements to produce oppositely directed rotary movements of said elements, and means holding said connections in said neutral position when the brakes are in inoperative position.

6. In a brake system of the band type, the combination with duplicate brake bands and a common brake band operating device, of means between the bands connected to each of said bands at a point intermediate its ends, said means cooperating with said device through the bands to equalize the braking effect of the latter.

7. In a brake system including duplicate brakes and a common brake operating device, the combination of two brake bands, means operated by the action of unequal braking effects of the brakes to produce oppositely directed rotary movements of said bands, and means included in said device operable by said rotary movements to produce oppositely applied variations in the braking pressure of said bands.

8. In a brake system including duplicate brakes and a common brake operating device, the combination of two brake bands, means connecting the bands operated by the action of unequal braking effects of the brakes to produce oppositely directed rotary movements of said bands, and means included in said device operable by said rotary movements to produce oppositely applied variations in the braking pressure of said bands.

9. In a brake system of the band type, the combination with duplicate brake bands and a common brake band operating device, of means connecting said bands independently of and cooperating with said device through the bands to equalize the braking effect of the latter, said means comprising a pair of oppositely disposed corresponding bell cranks pivoted respectively to relatively fixed parts and having corresponding arms connected to respective bands at points intermediate their ends, and a rod connecting the other corresponding arms of the bell cranks.

10. In a brake system of the band type, the combination with duplicate brake bands and a common brake band operating device, of means connecting said bands independently of and cooperating with said device through the bands to equalize the braking effect of the latter, said means comprising a pair of oppositely disposed corresponding bell cranks pivoted respectively to relatively fixed parts and having corresponding arms connected to respective bands, a rod connecting the other corresponding arms of the bell cranks, and means constantly tending to hold said rod in a given position with respect to the bands.

In testimony whereof I hereunto affix my signature.

GEORGE L. SMITH.